United States Patent
Chen

(10) Patent No.: US 11,214,762 B2
(45) Date of Patent: Jan. 4, 2022

(54) COMPOSITIONS AND METHODS FOR CLEANING URETHANE MOLDS

(71) Applicant: Chem-Trend Limited Partnership, Howell, MI (US)

(72) Inventor: Xuejin Chen, South Lyon, MI (US)

(73) Assignee: Chem-Trend Limited Partnership, Howell, MI (US)

( * ) Notice: Subject to any disclaimer, the term of this patent is extended or adjusted under 35 U.S.C. 154(b) by 97 days.

(21) Appl. No.: 16/531,406

(22) Filed: Aug. 5, 2019

(65) Prior Publication Data

US 2021/0040421 A1 Feb. 11, 2021

(51) Int. Cl.
| | | |
|---|---|---|
| *C11D 3/43* | (2006.01) | |
| *C11D 7/50* | (2006.01) | |
| *B29C 33/72* | (2006.01) | |
| *C11D 7/26* | (2006.01) | |
| *C11D 11/00* | (2006.01) | |

(52) U.S. Cl.
CPC .......... *C11D 7/5013* (2013.01); *B29C 33/722* (2013.01); *C11D 7/263* (2013.01); *C11D 7/5027* (2013.01); *C11D 11/0041* (2013.01)

(58) Field of Classification Search
CPC ....... C11D 3/43; C11D 7/267; C11D 11/0041; C11D 7/3281
USPC ......................................................... 510/212
See application file for complete search history.

(56) References Cited

U.S. PATENT DOCUMENTS

| | | | |
|---|---|---|---|
| 4,477,288 A | 10/1984 | Kazmierczak et al. | |
| 4,537,638 A | 8/1985 | Petersen et al. | |
| 5,049,314 A * | 9/1991 | Short | C11D 3/43 510/212 |
| 5,102,573 A | 4/1992 | Han et al. | |
| 5,259,993 A * | 11/1993 | Short | C11D 1/345 134/38 |
| 5,334,331 A * | 8/1994 | Fusiak | C09D 9/005 134/38 |
| 5,346,640 A * | 9/1994 | Leys | C09D 9/005 134/38 |
| 5,514,300 A | 5/1996 | Vlasblom | |
| 6,100,227 A | 8/2000 | Burlew | |
| 6,124,253 A | 9/2000 | Vinci et al. | |
| 8,653,015 B2 | 2/2014 | Keller et al. | |
| 8,828,917 B2 | 9/2014 | Rieth et al. | |
| 2003/0083220 A1 * | 5/2003 | Doyel | C11D 7/261 510/412 |
| 2010/0293723 A1 * | 11/2010 | Racette | C11D 1/345 8/142 |
| 2012/0040880 A1 * | 2/2012 | Rieth | A61K 8/39 510/138 |
| 2021/0040421 A1 * | 2/2021 | Chen | C11D 7/263 |

FOREIGN PATENT DOCUMENTS

| | | |
|---|---|---|
| JP | H01188311 A | 7/1989 |
| JP | H093494 A | 1/1997 |
| JP | 2006330586 A | 12/2006 |
| WO | WO-2013052809 A1 | 4/2013 |

OTHER PUBLICATIONS

Extended European Search Report from corresponding EP Application 20189082.9 dated Nov. 23, 2020 (8 pages).
Chinese Office Action for corresponding Chinese Application 2020107774386, dated Jul. 21, 2021, with English language translation (11 pages).

* cited by examiner

*Primary Examiner* — Gregory E Webb
(74) *Attorney, Agent, or Firm* — Daniel J. Sepanik, Esq.; Harness, Dickey & Pierce P.L.C.

(57) ABSTRACT

Compositions and methods for cleaning surfaces, such as for removing residues or other coatings from molds and other industrial parts, such compositions comprising, for example, a first solvent comprising a pyrrolidone such as 2-pyrrolidone, 1-(2-hydroxyethyl)-2-pyrrolidone, or mixture thereof; and a second solvent selected from the group consisting of an imidazole (such as 1,2-dimethylimidizole), an alkylene glycol ether (such as ethylene glycol monobutyl ether or diethylene glycol monobutyl ether, a terpene (such as d-limonene), and mixtures thereof. In various embodiments, such methods are for removing residues from molds used in forming polyurethane parts, wherein residues comprise polyurethane, urethane reactants, and mold release agents. The compositions may be substantially free of 1-methyl-2-pyrrolidone and of 1-ethyl-2-pyrrolidone.

27 Claims, No Drawings

COMPOSITIONS AND METHODS FOR CLEANING URETHANE MOLDS

BACKGROUND

The present technology relates to compositions and methods for cleaning residues from surfaces, such as surfaces of molds and other parts used in manufacturing. For example, such compositions and methods relate to the cleaning of urethane-containing residues from molds used in forming urethane parts.

Polyurethane is a polymeric material derived from the reaction of polyols and isocyanates at specified temperatures. Polyurethanes are widely used in a wide variety of industrial and consumer products, such as automotive seating, automotive steering wheels, window encapsulations, head and arm rests, carpeting back foams, insulation, shoe soles, coatings and paints, pillows and bed pads, artificial veneer stones, and furniture.

Many polyurethane articles are made using molds with different shapes and material requirements. There are several materials which are commonly employed that meet the diverse needs for mold construction in the polyurethane industry, including aluminum, steel, stainless steel, epoxy, polyester, and polypropylene. During production, operators have to spray one or more layers of a mold release agent containing waxes, silicones, resins, oils, etc., to minimize adherence of the produced foam to the mold during the molding process. Nevertheless, polyurethane residue may remain on the mold surfaces, along with polyurea, waxes, silicones, resins and/or oils. Such residues need to be removed to prevent surface disruption or other part defects.

Residues may be removed from the surface using mold cleaning compositions or by physical methods such as dry ice blasting. Operators normally apply mold cleaners onto the mold surface to be cleaned by wiping, brushing, or spraying. After waiting for a short period of time (usually a few minutes), mechanical force is applied to rub, scrape or wipe off the residue. Elevated temperatures may make the cleaning process significantly easier and faster, although, the cleaners can be used at room temperatures with additional processing time.

Compositions containing solvents and other materials that can decompose polyurethanes and polyurea have proven to be effective cleaners. The interactions between solvents (and/or the other cleaning materials) and polyurethanes (or polyurea) include penetration (soaking or surface wetting), swelling, degradation (bond breaking), dissolving, and lifting from the mold surface.

Historically, solvents such as N,N-dimethyl formamide (DMF) and dimethyl sulfoxide (DMSO) have been used for mold cleaning. However, because of safety concerns, many cleaning compositions use 1-methyl-2-pyrrolidone (NMP), 1-ethyl-2-pyrrolidone (NEP), or both. Even these solvents may present toxicity risks, though. Moreover, NMP and NEP can degrade some mold materials such as polyester, and can also damage nitrile gloves quickly, which can make the mold cleaning process more hazardous and inconvenient.

SUMMARY

The present technology provides compositions and methods for cleaning surfaces, such as for removing residues or other coatings from molds and other industrial parts. In various embodiments, such methods are for removing residues from molds used in forming polyurethane parts, wherein residues comprise polyurethane, urethane reactants, and mold release agents. In various embodiments, such methods are for removing paints, varnishes or other coatings from surfaces.

In some embodiments, the present technology provides compositions comprising: a first solvent comprising a pyrrolidone; and a second solvent selected from the group consisting of an imidazole solvent, an alkylene glycol ether, a terpene, and mixtures thereof. The first solvent may be selected from the group consisting of 2-pyrrolidone, 1-(2-hydroxyethyl)-2-pyrrolidone, and mixtures thereof. In various embodiments, the second solvent comprises an alkylene glycol ether selected from the group consisting of ethylene glycol monobutyl ether, diethylene glycol monobutyl ether, and mixtures thereof. The imidazole solvent may be 1,2-dimethylimidizole, and the terpene may be limonene. Preferably, the compositions are substantially free of 1-methyl-2-pyrrolidone and of 1-ethyl-2-pyrrolidone.

The present technology also provides compositions comprising a solvent selected from the group consisting of pyrrolidones, imidazole solvents, and mixtures thereof, and an alkylene glycol ether. For example, compositions comprise (or consist essentially of): 2-pyrrolidone or other pyrrolidone, and ethylene glycol monobutyl ether or other alkylene glycol ether. Another exemplary composition comprises (or consists essentially of): 1,2-dimethylimidizole or other imidazole, and diethylene glycol monobutyl ether.

The present technology also provides methods for cleaning a residue from the surface of a mold or other part, comprising contacting the surface with any of the compositions of the present technology, such as described above. In various aspects, such residues comprise polyurethane. For example, the residue may comprise a high-density polyurethane and the composition comprises an imidazole. For example, the residue may comprise a wax or oil, and the composition comprises an alkylene glycol ether. In various embodiments, the mold or part comprises an epoxy or polyethylene material.

It has been found that the compositions and methods of the present technology are effective in cleaning a wide range of residues from molds and other parts, while, in various embodiments, providing benefits relative to compositions and methods known in the art. Such benefits may include reduced toxicity (e.g, lower reproductive toxicity), enhanced safety (e.g., reduced flammability), and reduced environmental risks relative to compositions and methods among those known in the art.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

As discussed above, the present technology provides compositions and methods for cleaning surfaces, such as molds and other industrial parts. In various embodiments, the compositions and methods are useful in cleaning residues from molds that are used in forming parts comprising polyurethane (as further discussed herein).

Compositions

In general, the present technology provides compositions comprising one or more solvents. In various aspects, such solvents are selected from the group consisting of a pyrrolidone, an imidazole solvent, an alkylene glycol ether, and mixtures thereof. For example, compositions may comprise a pyrrolidone selected from the group consisting of a mixture of a pyrrolidone and an aklyene glycol ether, or a mixture of an imidazole and an alkylene glycol ether.

Pyrrolidone:

The compositions of the present technology may comprise one or more pyrrolidones. Such pyrrolidones include 2-pyrrolidone, 1-benzyl-2-pyrrolidone, 1-(2-hydroxyethyl)-2-pyrrolidone, N-isopropyl-2-pyrrolidone, N-cyclohexyl-2-pyrrolidone, N-dimethylaminopropyl-2-pyrrolidone, N-propyl-2-pyrrolidone, and vinyl pyrrolidone.

In various embodiments, the compositions comprise a pyrrolidone selected from the group consisting 2-pyrrolidone, 1-(2-hydroxyethyl)-2-pyrrolidone, or mixtures thereof. In some embodiments, the compositions comprise 2-pyrrolidone.

Preferably, compositions are essentially free of 1-methyl-2-pyrrolidone (NMP) and of 1-ethyl-2-pyrrolidone (NEP). As referred to herein "substantially free" means that such compositions contain less than about 5%, less than about 1%, less than 0.5%, less than 0.1% or less than 0.05% of NMP and NEP, individually and, in some embodiments, collectively. In some embodiments, compositions do not contain detectable levels of either NMP, NEP or both NMP and NEP.

Imidazole Solvent:

The compositions of the present technology may comprise one or more imidazoles or similar heterocyclic amine solvents ("imidazole solvents"). Such imidazole solvents include 1,2-dimethylimidazole, 1-methylimidazole, 2-methylimidazole, 4-methylimidazole, 2-ethylimidazole, 2-isopropylimidazole, 2-ethyl-4-methylimidazole, 2-phenylimidazole, 4-phenylimidazole, benzimidazole, morpholine, and mixtures thereof. In various embodiments, the imidazole solvent is an imidazole, such as 1,2-dimethylimidazole. In some embodiments, compositions comprise morpholine.

Alkylene Glycol Ether:

The compositions of the present technology may comprise one or more alkylene glycol ethers. Such ethers include ethylene glycol monobutyl ether, diethylene glycol monobutyl ether, ethylene glycol methyl ether acetate, ethylene glycol ethyl ether, ethylene glycol hexyl ether, ethylene glycol propyl ether, ethylene glycol n-butyl ether acetate, ethylene glycol phenyl ether, diethylene glycol methyl ether, diethylene glycol ethyl ether, diethylene glycol hexyl ether, diethylene glycol propyl ether, diethylene glycol n-butyl ether acetate, propylene glycol methyl ether, propylene glycol ethyl ether, propylene glycol propyl ether, propylene glycol methyl ether acetate, propylene glycol butyl ether, propylene glycol phenyl ether, dipropylene glycol butyl ether, dipropylene glycol methyl ether, dipropylene glycol propyl ether, dipropylene glycol tert-butyl ether, triethylene glycol methyl ether, triethylene glycol benzyl ether, triethylene glycol phenyl ether, tripropylene glycol methyl ether, tripropylene glycol n-butyl ether, tetraethylene glycol benzyl ether, tetraethylene glycol phenyl ether, pentaethylene glycol benzyl ether, pentaethylene glycol phenyl ether, hexaethylene glycol benzyl ether, hexaethylene glycol phenyl ether, heptaethylene glycol benzyl ether, and heptaethylene glycol phenyl ether.

In various embodiments, the compositions comprise an alkylene glycol ether selected from the group consisting of ethylene glycol monobutyl ether, diethylene glycol monobutyl ether, and mixtures thereof. In some embodiments the alkylene glycol ether is diethylene glycol monobutyl ether.

Terpene:

The compositions of the present technology may comprise a terpene. Such terpenes include monoterpenes, sequiterpenes, and diterpenes. In some embodiments, the terpene is limonene, e.g., d-limonene.

Optional Components:

The compositions of the present technology may optionally comprise additional solvents and other materials depending on such factors as the particular residues and surfaces to be cleaned and the conditions under which the compositions are to be used. In particular, compositions may comprise optional solvents in addition to, or instead of, the pyrrolidones, imdidazoles, akylene glycol ethers, and terpenes described above. Such solvents may include one or more aliphatic and aromatic hydrocarbons, alcohols, ketones, esters, and other glycol ethers. For example, in addition to or instead of the alkylene glycol ethers described above, the compositions may comprise an additional solvent selected from the group consisting of 2-ethylhexynol, 2-ethylhexyl acetate, ethylene glycol diacetate, dimethyl 2-methylpentanedioate, acetone, methyl ethyl ketone, 2-butoxyethyl acetate, t-butanol, n-propanol, diacetone alcohol, dibasic ester, and mixtures thereof. Additional optional materials include odor masking agents, coupling agents, colorants, corrosion inhibitors, thickeners, and rust inhibitors.

As discussed above, in various embodiments, the compositions of the present technology comprise mixtures of solvents. For example, a surface cleaning composition may comprise:

a first solvent comprising a pyrrolidone; and
a second solvent selected from the group consisting of an imidazole, an alkylene glycol ether, a terpene, and mixtures thereof.

In various embodiments, a surface cleaning composition comprises:

a solvent selected from the group consisting of pyrrolidones, imidazoles, and mixtures thereof; and
an alkylene glycol ether.

The levels of solvents and optional materials in the surface cleaning compositions may vary according to such factors as the surfaces to be cleaned, the residue to be removed, and the conditions under which the compositions are to be used. In general, each component is present at a level of at least 1%, or at least 5%, or at least 10%, or at least 15%, or at least 25%, or at least 30%, or at least 35%, or at least 40%, or at least 45%, or at least 50%, or at least 55%, or at least 60%. Each component may be present at a level of less than 98%, or less than 97%, or less than 96%, or less than 95%, or less than 90%, or less than 85%, or less than 80%, or less than 75%, or less than 70%, or less than 65%, or less than 60%, or less than 55%, or less than 50%, or less than 45%, or less than 40%, or less than 35%, or less than 30%, or less than 25%, or less than 20%. For example, in various embodiments, the level of pyrrolidone may range from 1% to 98% of the cleaning composition, or from 5% to 96%, or from 10% to 90%, or from 20% to 80%, or from 30% to 70%, or from 40% to 60% of the cleaning composition. In some embodiments, the level of pyrrolidone is from 5% to 30%. Similarly, the level of imidazole solvent may range from 1% to 97% of the cleaning composition, or from 5% to 95%, or from 10% to 90%, or from 20% to 80%, or from 30% to 70%, or from 40% to 60% of the cleaning composition. In some embodiments, the level of imadizole is from 20% to 50%. The level of alkylene glycol ether may range from 1% to 97% of the cleaning composition, or from 5% to 95%, or from 10% to 90%, or from 20% to 80%, or from 30% to 70%, or from 40% to 60% of the cleaning composition. In some embodiments, the level of alklyene glycol ether is from 10% to 60%. The level of terpene may range from 1% to 97% of the cleaning composition, or from 5% to 95%, or from 10% to 90%, or from 20% to 80%, or from 30% to 70%, or from 40% to 60% of the cleaning composition. In some embodiments, the level of terpene is from 5% to 25%.

In some embodiments comprising 2-pyrrolidone with ethylene glycol monobutyl ether or diethylene glycol monobutyl ether, the ratio of 2-pyrrolidone to total glycol ethers can range from 1:99 to 99:1 (by weight). In some embodiments, the ratio of 2-pyrrolidone to total glycol ethers ranges from 4:1 to 1:4, or from 3:1 to 1:3, and may be 1:1. In embodiments comprising 1,2-dimethylimidazole with ethylene glycol monobutyl ether or diethylene glycol monobutyl ether, the ratio of 1,2-dimethylimidazole to total glycol ethers can range from 1:99 to 99:1 (by weight). In some embodiments comprising 2-pyrrolidone and 1,2-dimethylimidazole with ethylene glycol monobutyl ether or diethylene glycol monobutyl ether, the ratio of 2-pyrrolidone and 1,2-dimethylimidazole to total glycol ethers can range from 1:99 to 98:1 (by weight).

As noted above, the specific composition of the surface cleaning composition may depend on the residue to be removed in a method of the present technology. For example, a surface cleaning composition for cleaning a variety of low- to high-density polyurethane foam residues may comprise from 15% to 35% of a pyrrolidone (such as 2-pyrrolidone), from 20% to 40% of imidazole (such as 1,2-dimethylimidazole), from 20% to 50% of glycol ether (such as ethylene glycol monobutyl ether), and from 10%-30% of terpene (such as d-limonene). For example, for removing a high-density polyurethane foam residue, such as may be used for making window encapsulation materials, a surface cleaning composition may comprise from 20% to 40% of a pyrrolidone (such as 2-pyrrolidone), from 15% to 40% of imidazole (such as 1,2-dimethylimidazole), from 10% to 55% of glycol ether (such as ethylene glycol monobutyl ether), and from 10%-55% of terpene (such as d-limonene). For example, for removing a low- to medium-density polyurethane foam, a surface cleaning composition may comprise from 30% to 60% of a pyrrolidone (such as 2-pyrrolidone), from 20% to 80% of glycol ether (such as ethylene glycol monobutyl ether), and from 10%-30% of terpene (such as d-limonene). In another embodiment used for removing low- to medium-density polyurethane foam residues, a surface cleaning composition may comprise from 20% to 60% of a pyrrolidone (such as 2-pyrrolidone), from 20% to 60% of glycol ether (such as ethylene glycol monobutyl ether), and from 10%-30% of terpene (such as d-limonene).

Without limiting the scope or utility of the present technology, in various embodiments the compositions of the present technology comprise synergistic levels of two or more solvents. As referred to herein, such "synergistic" levels exhibit greater cleaning efficacy (e.g., greater removal of a residue) for the combination of solvents than for each component solvent individually.

Methods

The present technology provides methods for removing a material from the surface of a part, such as for cleaning (i.e., removing residues) from the surface of a mold. In various embodiments, such methods include cleaning of industrial parts, removing residues from molds, removing paint or other coatings from surfaces, and removing adhesive materials from surfaces. For example, such residues may be a material deposited or formed on a surface during a manufacturing process, including contaminants, materials deposited to protect the surface during the process, reagents that remain unreacted or unused during the process, or materials formed during the process. In various embodiments, residues that are removed in such cleaning methods include polymers (such as polyurethane and silicone polymers), grease, oils, and waxes.

In various embodiments, methods include removing coatings from surfaces, such as paint, varnishes, and other materials that may have been applied to a surface for decorative, protective, or other functional purposes. Paints include water-based (e.g., latex paints) or hydrocarbon solvent-based (e.g., oil-based paints). Varnishes include urethane varnishes and shellac varnishes.

As discussed above, in various embodiments methods comprise removing residues from molds used in forming polyurethane parts. Such methods may comprise application of a surface cleaning composition of the present technology to the surface of a mold to remove residues from the molding process. As discussed above, the specific composition may depend on the composition of the polyurethane, depending (for example) on the density of the polyurethane.

Polyurethane is a polymeric material derived from the reaction of polyols and isocyanates at specified temperatures. Polyols are organic compounds that contain multiple hydroxyl groups, and can mainly be divided into two types: polyether and polyester polyols. Under different temperature ranges, the polyols react with various isocyanates to form linear, 2 or 3-dimensional polymeric structures, which are termed polyurethanes. The polyols that are used in polyurethane manufacturing consist of various polyol compounds, catalysts, water, surfactants, and other ingredients. Isocyanates include a variety of bifunctional molecules such as toluene diisocyanate (TDI), methylene diphenyl diisocyanate (MDI) and other commercially available isocyanates and their mixtures. The specific composition of polyols and isocyanates may vary depending on the end-use and desired properties of the polyurethane.

During production, operators typically apply (e.g., spray) one or more layers of a mold release agent containing waxes, silicones, resins, oils, etc., to minimize adherence of the polyurethane to the mold during the molding process. However, polyurethanes may stick to the mold surfaces. These adhered residues contain polyurethane and polyurea, in addition to waxes, silicones, resins and/or oils. The residues need to be removed to prevent surface disruption or other part defects.

Methods of the present technology comprise contacting a surface (e.g., of a mold or other part) with a composition of the present technology, including one or more of any of the surface cleaning compositions of the present technology. Contacting may comprise any suitable method or methods of applying a composition to the surface, which may depend on such factors as the specific surface cleaning composition used, the location of the surface relative to other surfaces of the part and adjacent parts, surface contours, composition of the surface (i.e., the material from which the mold or other part is comprised), the composition of the residue, and the quantity of the residue. For example, such contacting may comprise one or more of spraying a surface cleaning composition on the surface, wiping a surface cleaning composition onto the surface, or brushing a surface cleaning composition onto the surface. Some methods may further remove the surface cleaning composition from the surface. The removing may be performed after waiting for a time of, for example, from 5 seconds to 30 minutes, from 30 seconds to 20 minutes, or from 1 minute to 10 minutes after the contacting. Removing may comprise spraying, rinsing, wiping, scraping or other methods by which the surface cleaning composition is removed from the surface, preferably including some or all of the residue. In some embodiments, one or more of the contacting, waiting or removing operations are performed at ambient conditions or at elevated temperatures (e.g., from 40° C. to 95° C., or from 50° C. to 80° C.). In some methods, one or more of the contacting or removing operations are repeated, and are repeated with intervening waiting operations.

As noted above, in various embodiments, compositions of the present technology are effective in removing materials from surfaces (e.g., removing residues from molds or other parts) that comprise materials that may be damaged by solvents used in cleaning methods among those known in the art, such as NMP and NEP. In general, such "solvent-sensitive materials" include any material that may be dissolved, softened or otherwise chemically or physically degraded by exposure to a solvent, such as NMP or NEP. For example, solvent-sensitive materials include thermoplastics (e.g., polypropylene and other polyolefins) and thermoset resins (such as polyester or epoxy resins). Accordingly, the present technology provides methods of removing a material from a surface comprising a solvent-sensitive material, comprising contacting the surface with a composition of the present technology. In some embodiments, methods comprise removing residues from a mold comprising a solvent-sensitive material, wherein the solvent-sensitive material comprises a thermoplastic or a thermoset resin. In some embodiments, the mold comprises a composite, such as a material comprising fiberglass and a thermoset resin such as polyester or epoxy. In some embodiments, the mold comprises a thermoplastic, such as polypropylene.

Embodiments of the present technology are further illustrated through the following non-limiting examples.

Example 1

A surface cleaning composition of the present technology is made comprising 1-(2-hydroxyethyl)-2-pyrrolidone, 1,2-dimethylimidazole, ethylene glycol monobutyl ether, and limonene, having the following composition.

| Material | Weight % |
| --- | --- |
| 1-(2-Hydroxyethyl)-2-pyrrolidone | 10.0 |
| 1,2-Dimethylimidazole | 30.0 |
| Ethylene glycol monobutyl ether | 40.0 |
| D-Limonene | 20.0 |
| Total | 100.0 |

The composition is applied to the surface of a mold having residue from the molding of a high-density polyurethane part at suitable elevated temperatures. After from 1 to 10 minutes, the composition is removed from the mold, resulting in a surface that is essentially free from the urethane residue.

Example 2

A surface cleaning composition of the present technology is made comprising 2-pyrrolidone, 1,2-dimethylimidazole, ethylene glycol monobutyl ether, and limonene, having the following composition.

| Material | Weight % |
| --- | --- |
| 2-Pyrrolidone | 25.0 |
| 1,2-Dimethylimidazole | 30.0 |
| Ethylene glycol monobutyl ether | 25.0 |
| D-Limonene | 20.0 |
| Total | 100.0 |

The composition is applied to the surface of a mold having residue from the molding of a window encapsulation part comprising high-density polyurethane at suitable elevated temperatures. After from 1 to 10 minutes, the composition is removed from the mold, resulting in a surface that is essentially free from the urethane residue.

Example 3

A surface cleaning composition of the present technology is made comprising 2-pyrrolidone, ethylene glycol monobutyl ether, and limonene, having the following composition.

| Material | Weight % |
| --- | --- |
| 2-Pyrrolidone | 40.0 |
| Ethylene glycol monobutyl ether | 40.0 |
| D-Limonene | 20.0 |
| Total | 100.0 |

The composition is applied to the surface of a mold having residue from the molding of a low-density polyurethane part. After from 1 to 10 minutes, the composition is removed from the mold, resulting in a surface that is essentially free from the urethane residue.

Example 4

A surface cleaning composition of the present technology is made comprising 2-pyrrolidone, diethylene glycol monobutyl ether, and limonene, having the following composition.

| Material | Weight % |
| --- | --- |
| 2-Pyrrolidone | 40.0 |
| Diethylene glycol monobutyl ether | 40.0 |
| D-Limonene | 20.0 |
| Total | 100.0 |

The composition is applied to the surface of a mold having residue from the molding of a low-density polyurethane part. After from 1 to 10 minutes, the composition is removed from the mold, resulting in a surface that is essentially free from the urethane residue.

Example 5

A surface cleaning composition of the present technology is made comprising 2-pyrrolidone, 1,2-dimethylimidazole, diethylene glycol monobutyl ether, and limonene, having the following composition.

| Material | Weight % |
| --- | --- |
| 2-Pyrrolidone | 25.0 |
| 1,2-Dimethylimidazole | 30.0 |
| Diethylene glycol monobutyl ether | 25.0 |
| D-Limonene | 20.0 |
| Total | 100.0 |

The composition is applied to the surface of a mold having residue from the molding of a medium-density polyurethane part. After from 1 to 10 minutes, the composition is removed from the mold, resulting in a surface that is essentially free from the urethane residue.

Product Test 1

The surface cleaning compositions of Examples 1-5 are tested for their ability to remove polyurethane residues from the surface of a part, compared to NMP, using the following test method.
1. Aluminum dishes having 6 cm diameter are cleaned with a nonpolar solvent such as mineral spirits by wiping with clean paper towel, followed by cleaning with a polar solvent such as acetone. The dishes are then heated on a hot plate at 450° C. to remove the solvents and other volatile substances.
2. The foam residues of the following two polyurethane foam systems having different densities are prepared.
    (a) A low density foam is made using Huntsman Daltoflex EI 21874 Polyol and Suprasec 2310 Isocyanate, having a polyol/isocyanate mix ratio of 2/1. The mold surface temperature is 65° C. The curing time of the polyurethane mix is 2 minutes.
    (b) A higher density foam is made using BASF Colo-Fast R8959/102/L30S Polyol and Iso 198/3 NA Isocyanate, having a polyol/isocyanate mix ratio of 100/65. The mold surface temperature is set to 100° C. Polyurethane curing time is 2 minutes.
A clean box mold is heated with cover to required temperatures (65° C. for the lower density foams; 100° C. for the higher density foams). The cleaned aluminum dishes are placed in the box mold for 10 minutes to let the dishes reach the required temperatures. The required amount of polyols and isocyanates are mixed according to the ratios, as described above. The components are mixed at 3000 rpm for 3-5 seconds and immediately poured into the aluminum dishes to make a 4-5 cm round foam spot in each dish. The polyurethane is allowed to cure for 2 minutes. After curing, the dishes are removed from the mold box and cooled. A knife is used to cut and remove extra foam from the top for lower density foam. The higher density foam is not cut.
3. The performance of the surface cleaning compositions is then tested as follows.
    (a) A box mold is heated to the desired testing temperatures for 10 minutes to let the tested dish with residue reach the testing temperature.
    (b) The surface cleaning composition to be tested is applied to the polyurethane residue, covering all parts of the residue.
    (c) A timer is started.
    (d) The polyurethane residue is checked for removability, using a wooden spatula.
    (e) When the residue can be completely removed from the inner surface of the dish with minimal force, the time is stopped and the lapsed time recorded.

The results for testing of the surface cleaning compositions of Examples 1-5 and for NMP, at three temperatures, are summarized in the following tables. The tables set forth the time determined in Step 3(e) of the method, above, at which the test residue can be completely removed from the surface of the test dish.

High Density Foam Residue

| Formula | 22° C. | 55° C. | 100° C. |
| --- | --- | --- | --- |
| NMP | Over night | 28 min. | 4.75 min. |
| Example 1 | Over night | 28 min. | 4.5 min. |
| Example 2 | Over night | 22 min. | 4.25 min. |
| Example 3 | Over night | 30 min. | 5 min. |
| Example 4 | Over night | 28 min. | 5.5 min. |
| Example 5 | Over night | 26 min. | 5 min. |

Low Density Foam Residue

| Formula | 22° C. | 55° C. |
| --- | --- | --- |
| NMP | 1.5 min. | 1 min. |
| Example 1 | 1.5 min. | 1 min. |
| Example 2 | 2 min. | 1 min. |
| Example 3 | 3 min. | 2 min. |
| Example 4 | 1.5 min. | 0.75 min. |
| Example 5 | 1 min. | 0.75 min. |

Product Test 2

The surface cleaning compositions of Examples 1-5 are tested for their ability to remove residues containing waxes, oils or silicones from a part, compared to NMP, using the following test method.

To perform the cleaning tests, three artificial residue compositions are made, as follows.
1. Artificial wax residue—The residue composition contains equal weights of 5 different waxes with various melting points or melting-ranges. These waxes cover the operating temperature range from 50° C. through 100° C. for different molding applications.
2. Artificial oil residue—The residue composition contains equal weights of 3 different oils, including petroleum oil and synthetic oils.
3. Artificial silicone residue—The residue composition contains equal weights of 2 different silicones with reactive and non-reactive materials.

After the materials of the artificial residues are made, a simulated mold surface is prepared for each of the wax, oil and silicone residues. The simulated mold surface is a cleaned Q-panel (15 cm×7.5 cm). The Q-panel is cleaned with mineral spirits, followed by acetone. It is then dried on a clean hot plate at 450° C. to evaporate all volatile substances, and allowed to cool. After the cleaned Q-panel is cooled, the artificial residue to be tested is applied to the panel at 6 different positions and spread into spots having a diameter of 1-1.5 cm. For waxes, the residue composition is melted, and then dropped and spread. The Q-panel is dried in a box mold at 80° C. for the oil and silicone residues.

The cleaning test is performed by rubbing the residue spot with a piece of paper towel soaked with the tested mold cleaning product. The number of rubs until the residue spot is completely cleaned is then counted. The paper towel is changed as it becomes dirty. Before the test, the Q-panel with the residue is heated to 45° C. in a box mold for 10 minutes. The results are shown in the table below.

| Product | Wax Residue | Oil Residue | Silicone Residue |
| --- | --- | --- | --- |
| NMP | 30 wipes | 20 wipes | 2 wipes |
| Example 1 | 21 wipes | 13 wipes | 2 wipes |
| Example 2 | 23 wipes | 10 wipes | 1 wipe |
| Example 3 | 19 wipes | 11 wipes | 2 wipes |
| Example 4 | 18 wipes | 12 wipes | 3 wipes |
| Example 5 | 17 wipes | 10 wipes | 2 wipes |

Non-Limiting Listing of Exemplary Embodiments

The present technology includes the following exemplary embodiments.
1. Surface cleaning compositions comprising:
   a first solvent comprising a pyrrolidone; and
   a second solvent selected from the group consisting of an imidazole solvent, an alkylene glycol ether, a terpene, and mixtures thereof.
2. Surface cleaning compositions of Embodiment 1, wherein the first solvent is selected from the group consisting of 2-pyrrolidone, 1-(2-hydroxyethyl)-2-pyrrolidone, and mixtures thereof.
3. Surface cleaning compositions of Embodiment 2, wherein the first solvent is 2-pyrrolidone.
4. Surface cleaning compositions of Embodiment 2, wherein the first solvent is 1-(2-hydroxyethyl)-2-pyrrolidone.
5. Surface cleaning compositions of any of the proceeding Embodiments, comprising from 5% to 30% of the pyrrolidone.
6. Surface cleaning compositions of any of the proceeding Embodiments, wherein the second solvent comprises an imidazole solvent.
7. Surface cleaning compositions of Embodiment 6, wherein the imidazole solvent is 1,2-dimethylimidizole.
8. Surface cleaning compositions of any of Embodiments 6-7, comprising from 20% to 50% of the imidazole solvent.
9. Surface cleaning compositions of any of the proceeding Embodiments, wherein the second solvent comprises an alkylene glycol ether.
10. Surface cleaning compositions of Embodiment 9, wherein the alkylene glycol ether is selected from the group consisting of ethylene glycol monobutyl ether, diethylene glycol monobutyl ether, ethylene glycol methyl ether acetate, ethylene glycol ethyl ether, ethylene glycol hexyl ether, ethylene glycol propyl ether, ethylene glycol n-butyl ether acetate, ethylene glycol phenyl ether, diethylene glycol methyl ether, diethylene glycol ethyl ether, diethylene glycol hexyl ether, diethylene glycol propyl ether, diethylene glycol n-butyl ether acetate, propylene glycol methyl ether, propylene glycol ethyl ether, propylene glycol propyl ether, propylene glycol methyl ether acetate, propylene glycol butyl ether, propylene glycol phenyl ether, dipropylene glycol butyl ether, dipropylene glycol methyl ether, dipropylene glycol propyl ether, dipropylene glycol tert-butyl ether, triethylene glycol methyl ether, triethylene glycol benzyl ether, triethylene glycol phenyl ether, tripropylene glycol methyl ether, tripropylene glycol n-butyl ether, tetraethylene glycol benzyl ether, tetraethylene glycol phenyl ether, pentaethylene glycol benzyl ether, pentaethylene glycol phenyl ether, hexaethylene glycol benzyl ether, hexaethylene glycol phenyl ether, heptaethylene glycol benzyl ether, and heptaethylene glycol phenyl ether, and mixtures thereof.
11. Surface cleaning compositions of Embodiment 10, wherein the alkylene glycol ether is selected from the group consisting of ethylene glycol monobutyl ether, diethylene glycol monobutyl ether, and mixtures thereof.
12. Surface cleaning compositions of Embodiment 10, wherein the alkylene glycol ether is ethylene glycol monobutyl ether.
13. Surface cleaning compositions of Embodiment 10, wherein the alkylene glycol ether is diethylene glycol monobutyl ether.
14. Surface cleaning compositions of Embodiment 10, wherein the alkylene glycol ether is a mixture of ethylene glycol monobutyl ether and diethylene glycol monobutyl ether.
15. Surface cleaning compositions of any of Embodiments 9-14, comprising from 10% to 60% of the alkylene glycol ether.
16. Surface cleaning compositions of any of the proceeding Embodiments, wherein the second solvent comprises a terpene.
17. Surface cleaning compositions of Embodiment 12, wherein the terpene is limonene, such as d-limonene.
18. Surface cleaning compositions of any of Embodiments 16 or 17, comprising from 5% to 25% of the terpene.
19. Surface cleaning compositions of any of the proceeding Embodiments, wherein the second solvent comprises a mixture of an imidazole and an alkylene glycol ether.
20. Surface cleaning compositions of any of the proceeding Embodiments, wherein the second solvent comprises a mixture of an imidazole, an alkylene glycol ether, and a terpene.
21. Surface cleaning compositions of any of the proceeding Embodiments, for removing low- to high-density polyurethane foam residues from a surface, comprising from 15% to 35% of a pyrrolidone (such as 2-pyrrolidone), from 20% to 40% of imidazole (such as 1,2-dimethylimidazole), from 20% to 50% of glycol ether (such as ethylene glycol monobutyl ether), and from 10%-30% of terpene (such as d-limonene).
22. Surface cleaning compositions of any of Embodiments 1-20, for removing high-density polyurethane foam residues from a surface, comprising from 20% to 40% of a pyrrolidone (such as 2-pyrrolidone), from 15% to 40% of imidazole (such as 1,2-dimethylimidazole), from 10% to 55% of glycol ether (such as ethylene glycol monobutyl ether), and from 10%-55% of terpene (such as d-limonene).
23. Surface cleaning compositions of any of the Embodiments 1-20, for removing low- to medium-density polyurethane foam residues from a surface, comprising from 30% to 60% of a pyrrolidone (such as 2-pyrrolidone), from 20% to 80% of glycol ether (such as ethylene glycol monobutyl ether), and from 10%-30% of terpene (such as d-limonene).
24. Surface cleaning compositions of any of the Embodiments 1-20, for removing low- to medium-density polyurethane foam residues from a surface, comprising from 20% to 60% of a pyrrolidone (such as 2-pyrrolidone), from 20% to 60% of glycol ether (such as ethylene glycol monobutyl ether), and from 10%-30% of terpene (such as d-limonene).
25. Surface cleaning compositions of any of the proceeding Embodiments, further comprising an optional materials selected from the group consisting of odor masking agents, coupling agents, colorants, corrosion inhibitors, thickeners, rust inhibitors, and mixtures thereof.

26. Surface cleaning compositions of any of the proceeding Embodiments which are substantially free of 1-methyl-2-pyrrolidone.
27. Surface cleaning compositions of any of the proceeding Embodiments, which are substantially free of 1-ethyl-2-pyrrolidone.
28. Surface cleaning compositions of Embodiments 26 or 27, which are substantially free of 1-methyl-2-pyrrolidone and 1-ethyl-2-pyrrolidone.
29. Surface cleaning compositions comprising:
   a solvent selected from the group consisting of pyrrolidones, imidazoles, and mixtures thereof; and
   an alkylene glycol ether.
30. Surface cleaning compositions of Embodiment 29, wherein the solvent comprises a pyrrolidone selected from the group consisting of 2-pyrrolidone, 1-(2-hydroxyethyl)-2-pyrrolidone, and mixtures thereof.
31. Surface cleaning compositions of Embodiment 30, comprising 2-pyrrolidone.
32. Surface cleaning compositions of Embodiment 30, comprising 1-(2-hydroxyethyl)-2-pyrrolidone.
33. Surface cleaning compositions of any of the Embodiments 29-32, comprising from 5% to 30% of the pyrrolidone.
34. Surface cleaning compositions of any of the Embodiments 29-33, wherein the solvent comprises an imidazole.
35. Surface cleaning compositions of Embodiment 34, wherein the imidazole is 1,2-dimethylimidizole.
36. Surface cleaning compositions of any of Embodiments 34 or 35, comprising from 20% to 50% of the imidazole.
37. The surface cleaning composition of any of the Embodiments 29, 33, or 36, wherein the solvent is selected from the group consisting of 2-pyrrolidone, 1-(2-hydroxyethyl)-2-pyrrolidone, 1,2-dimethylimidizole, and mixtures thereof.
38. Surface cleaning compositions of Embodiment 29-37, wherein the alkylene glycol ether is selected from the group consisting of ethylene glycol monobutyl ether, diethylene glycol monobutyl ether, ethylene glycol methyl ether acetate, ethylene glycol ethyl ether, ethylene glycol hexyl ether, ethylene glycol propyl ether, ethylene glycol n-butyl ether acetate, ethylene glycol phenyl ether, diethylene glycol methyl ether, diethylene glycol ethyl ether, diethylene glycol hexyl ether, diethylene glycol propyl ether, diethylene glycol n-butyl ether acetate, propylene glycol methyl ether, propylene glycol ethyl ether, propylene glycol propyl ether, propylene glycol methyl ether acetate, propylene glycol butyl ether, propylene glycol phenyl ether, dipropylene glycol butyl ether, dipropylene glycol methyl ether, dipropylene glycol propyl ether, dipropylene glycol tert-butyl ether, triethylene glycol methyl ether, triethylene glycol benzyl ether, triethylene glycol phenyl ether, tripropylene glycol methyl ether, tripropylene glycol n-butyl ether, tetraethylene glycol benzyl ether, tetraethylene glycol phenyl ether, pentaethylene glycol benzyl ether, pentaethylene glycol phenyl ether, hexaethylene glycol benzyl ether, hexaethylene glycol phenyl ether, heptaethylene glycol benzyl ether, and heptaethylene glycol phenyl ether, and mixtures thereof.
39. The surface cleaning composition of Embodiment 38, wherein the alkylene glycol ether is selected from the group consisting of ethylene glycol monobutyl ether, diethylene glycol monobutyl ether, and mixtures thereof.
40. Surface cleaning compositions of Embodiment 39, wherein the alkylene glycol ether is ethylene glycol monobutyl ether.
41. Surface cleaning compositions of Embodiment 39, wherein the alkylene glycol ether is diethylene glycol monobutyl ether.
42. Surface cleaning compositions of Embodiment 39, wherein the alkylene glycol ether is a mixture of ethylene glycol monobutyl ether and diethylene glycol monobutyl ether.
43. Surface cleaning compositions of any of Embodiments 38-42, comprising from 10% to 60% of the alkylene glycol ether.
44. Surface cleaning compositions of any of Embodiments 29-43, further comprising a terpene.
45. Surface cleaning compositions of Embodiment 44, wherein the terpene is limonene, such as d-limonene.
46. Surface cleaning compositions of any of Embodiments 44 or 45, comprising from 5% to 25% of the terpene.
47. Surface cleaning compositions of any of the Embodiments 29-46, further comprising an optional materials selected from the group consisting of odor masking agents, coupling agents, colorants, corrosion inhibitors, thickeners, rust inhibitors, and mixtures thereof.
48. Surface cleaning compositions of any of the Embodiments 29-47, which are substantially free of 1-methyl-2-pyrrolidone.
49. Surface cleaning compositions of any of the Embodiments 29-47, which are substantially free of 1-ethyl-2-pyrrolidone.
50. Surface cleaning compositions of Embodiments 48 or 49, which are substantially free of 1-methyl-2-pyrrolidone and 1-ethyl-2-pyrrolidone.
51. A composition for cleaning a urethane-containing residue from the surface of a mold, the composition consisting essentially of:
   a first solvent selected from the group consisting of pyrrolidones, imidazoles, and mixtures thereof;
   an alkylene glycol ether;
   optionally, a terpene; and
   optionally, an optional materials selected from the group consisting of odor masking agents, coupling agents, colorants, corrosion inhibitors, thickeners, rust inhibitors, and mixtures thereof.
52. Surface cleaning compositions of Embodiment 51, wherein the first solvent contains a pyrrolidone selected from the group consisting of 2-pyrrolidone, 1-(2-hydroxyethyl)-2-pyrrolidone, and mixtures thereof.
53. Surface cleaning compositions of Embodiment 52, wherein the first solvent contains 2-pyrrolidone.
54 Surface cleaning compositions of Embodiment 52, wherein the first solvent contains 1-(2-hydroxyethyl)-2-pyrrolidone.
55. Surface cleaning compositions of any of the Embodiments 52-54, containing from 5% to 30% of the pyrrolidone.
56. Surface cleaning compositions of any of the Embodiments 51-55, wherein the solvent contains an imidazole.
57. Surface cleaning compositions of Embodiment 56, wherein the imidazole is 1,2-dimethylimidizole.
58. Surface cleaning compositions of any of Embodiments 56 or 57, containing from 20% to 50% of the imidazole.
59. The surface cleaning composition of any of the Embodiments 51, 55, or 58, wherein the solvent is selected from the group consisting of 2-pyrrolidone, 1-(2-hydroxyethyl)-2-pyrrolidone, 1,2-dimethylimidizole, and mixtures thereof.
60. Surface cleaning compositions of Embodiment 51-59, wherein the alkylene glycol ether is selected from the group consisting of ethylene glycol monobutyl ether), diethylene glycol monobutyl ether, ethylene glycol methyl ether acetate, ethylene glycol ethyl ether, ethylene glycol hexyl ether, ethylene glycol propyl ether, ethylene glycol n-butyl ether acetate, ethylene glycol phenyl ether, diethylene glycol methyl ether, diethylene glycol ethyl ether, diethylene glycol hexyl ether, diethylene glycol propyl ether, diethylene glycol n-butyl ether acetate, propylene glycol methyl ether, propylene glycol ethyl ether, propylene glycol propyl ether, propylene glycol methyl ether acetate, propylene glycol butyl ether, propylene glycol phenyl ether, dipropylene glycol butyl ether, dipropylene glycol methyl ether, dipropylene glycol propyl ether, dipropylene glycol tert-butyl ether, triethylene glycol methyl ether, triethylene glycol benzyl ether, triethylene glycol phenyl ether, tripropylene glycol methyl ether, tripropylene glycol n-butyl ether, tetraethylene glycol benzyl ether, tetraethylene glycol phenyl ether, pentaethylene glycol benzyl ether, pentaethylene glycol phenyl ether, hexaethylene glycol benzyl ether, hexaethylene glycol phenyl ether, heptaethylene glycol benzyl ether, and heptaethylene glycol phenyl ether, and mixtures thereof.

61. The surface cleaning composition of Embodiment 60, wherein the alkylene glycol ether is selected from the group consisting of ethylene glycol monobutyl ether, diethylene glycol monobutyl ether, and mixtures thereof.

62. Surface cleaning compositions of Embodiment 61, wherein the ethylene glycol monobutyl ether.

63. Surface cleaning compositions of Embodiment 61, wherein the diethylene glycol monobutyl ether.

64. Surface cleaning compositions of Embodiment 61, wherein the alkylene glycol ether is a mixture of ethylene glycol monobutyl ether and diethylene glycol monobutyl ether.

65. Surface cleaning compositions of any of Embodiments 51-64, comprising from 10% to 60% of the alkylene glycol ether.

66. Surface cleaning compositions of any of Embodiments 51-65, containing a terpene.

67. Surface cleaning compositions of Embodiment 66, wherein the terpene is limonene, such as d-limonene.

68. Surface cleaning compositions of any of Embodiments 66 or 67, containing from 5% to 25% of the terpene.

69. Methods of removing a material from a surface of a mold or other part, comprising contacting the surface with a composition according to any of the proceeding Embodiments.

70. Methods of removing a material according to Embodiment 69, wherein the material is a residue comprising polyurethane.

71. Methods of removing a material according to Embodiment 69, wherein the residue comprises a high-density polyurethane and the composition comprises an imidazole.

72. The method of removing a material according to Embodiment 69, wherein the residue further comprises a wax or oil, and the composition comprises an alkylene glycol ether.

73. The method of removing a material according to any of Embodiments 69-72, wherein the surface comprises a solvent-sensitive material.

74. The method of removing a material according to Embodiment 73, wherein the solvent-sensitive material comprises a thermoplastic, a thermoset resin, or combination thereof.

75. The method of removing a material according to Embodiment 74, wherein the solvent-sensitive material comprises a polyolefin, such as polypropylene.

76. The method of removing a material according to Embodiment 74, wherein the solvent-sensitive material comprises a thermoset resin, such as polyethylene or epoxy resin.

77. The method of removing a material according to Embodiments 73 or 76, wherein the surface is the surface of a mold.

78. The method of removing a coating from the surface of a part comprising contacting the surface with a composition according to any of Embodiments 1-68.

79. The method of Embodiment 78, wherein the coating is a paint or varnish.

Non-Limiting Discussion of Terminology

The foregoing description is merely illustrative in nature and is in no way intended to limit the technology, its application, or uses. The broad teachings of the technology can be implemented in a variety of forms. Therefore, while this technology includes particular examples, the true scope of the technology should not be so limited since other modifications will become apparent upon a study of the drawings, the specification, and the following claims.

The headings (such as "Background" and "Summary") and sub-headings used herein are intended only for general organization of topics within the present technology, and are not intended to limit the technology of the technology or any aspect thereof. In particular, subject matter disclosed in the "Background" may include novel technology and may not constitute a recitation of prior art. Subject matter disclosed in the "Summary" is not an exhaustive or complete technology of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It should be understood that one or more steps within a method may be executed in different order (or concurrently) without altering the principles of the present technology. Further, although each of the embodiments is described above as having certain features, any one or more of those features described with respect to any embodiment of the technology can be implemented in and/or combined with features of any of the other embodiments, even if that combination is not explicitly described. In other words, the described embodiments are not mutually exclusive, and permutations of one or more embodiments with one another remain within the scope of this technology. For example, a component which may be A, B, C, D or E, or combinations thereof, may also be defined, in some embodiments, to be A, B, C, or combinations thereof.

As used herein, the phrase at least one of A, B, and C should be construed to mean a logical (A OR B OR C), using a non-exclusive logical OR, and should not be construed to mean "at least one of A, at least one of B, and at least one of C."

As used herein, the words "prefer" or "preferable" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

"A" and "an" as used herein indicate "at least one" of the item is present; a plurality of such items may be present, when possible.

Unless specified otherwise, all percentages herein are by weight.

Numeric values stated herein should be understood to be approximate, and interpreted to be about the stated value, whether or not the value is modified using the word "about." Thus, for example, a statement that a parameter may have value "of X" should be interpreted to mean that the parameter may have a value of "about X." The term "about" indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates variations that may arise from ordinary methods of manufacturing, measuring or using the material, device or other object to which the calculation or measurement applies.

As referred to herein, ranges are, unless specified otherwise, inclusive of endpoints and include technology of all distinct values and further divided ranges within the entire range. Thus, for example, a range of "from A to B" or "from about A to about B" is inclusive of A and of B. Further, the phrase "from about A to about B" includes variations in the values of A and B, which may be slightly less than A and slightly greater than B; the phrase may be read be "about A, from A to B, and about B." Technology of values and ranges of values for specific parameters (such as temperatures, molecular weights, weight percentages, etc.) are not exclusive of other values and ranges of values useful herein.

It is also envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that technology of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

What is claimed is:

1. A surface cleaning composition comprising:
   from about 15% to about 40% of a pyrrolidone selected from the group consisting of 2-pyrrolidone, 1-(2-hydroxyethyl)-2-pyrrolidone, and mixtures thereof;
   from about 15% to about 40% of an imidazole solvent; and
   from about 10% to about 55% of an alkylene glycol ether.

2. The surface cleaning composition of claim 1, wherein the imidazole solvent is 1,2-dimethylimidazole.

3. The surface cleaning composition of claim 1, wherein the second solvent comprises an alkylene glycol ether.

4. The surface cleaning composition of claim 3, wherein the alkylene glycol ether is selected from the group consisting of ethylene glycol monobutyl ether, diethylene glycol monobutyl ether, and mixtures thereof.

5. The surface cleaning composition of claim 1, further comprising limonene.

6. The surface cleaning composition of claim 1 which is substantially free of 1-methyl-2-pyrrolidone and of 1-ethyl-2-pyrrolidone.

7. A surface cleaning composition comprising:
   a pyrrolidone; and
   1,2-dimethylimidazole.

8. The surface cleaning composition of claim 7, wherein the pyrrolidone is selected from the group consisting of 2-pyrrolidone, 1-(2-hydroxyethyl)-2-pyrrolidone, and mixtures thereof.

9. The surface cleaning composition of claim 8, further comprising an alkylene glycol ether selected from the group consisting of ethylene glycol monobutyl ether, diethylene glycol monobutyl ether, and mixtures thereof.

10. The surface cleaning composition of claim 7, further comprising an alkylene glycol ether selected from the group consisting of ethylene glycol monobutyl ether, diethylene glycol monobutyl ether, and mixtures thereof.

11. The surface cleaning composition of claim 7, further comprising limonene.

12. A method of removing a material from a surface of a mold or other part, comprising contacting the surface with a composition comprising 1,2-dimethylimidazole.

13. The method of removing a material according to claim 12, wherein the material is a residue comprising polyurethane.

14. The method of removing a material according to claim 13, wherein the residue comprises a high-density polyurethane.

15. The method of removing a material according to claim 13, wherein the residue further comprises a wax or oil, and the composition comprises an alkylene glycol ether.

16. The method of removing a material according to claim 12, wherein the composition is substantially free of 1-methyl-2-pyrrolidone and of 1-ethyl-2-pyrrolidone.

17. The method of removing a material according to claim 16, wherein the mold comprises an epoxy or polyethylene material.

18. The method of claim 12, wherein the composition further comprises a pyrrolidone selected from the group consisting of 2-pyrrolidone, 1-(2-hydroxyethyl)-2-pyrrolidone, and mixtures thereof.

19. The method of removing a material according to claim 7, wherein the composition is substantially free of 1-methyl-2-pyrrolidone and of 1-ethyl-2-pyrrolidone.

20. A surface cleaning composition comprising:
   from about 30% to about 80% of a pyrrolidone selected from the group consisting of 2-pyrrolidone, 1-(2-hydroxyethyl)-2-pyrrolidone, and mixtures thereof; and
   from about 20% to about 80% of an alkylene glycol ether selected from the group consisting of ethylene glycol monobutyl ether, diethylene glycol monobutyl ether, and mixtures thereof.

21. The surface cleaning composition of claim 20, further comprising 1,2-dimethylimidazole.

22. A method for removing a residue comprising polyurethane from a surface of a mold or other part, the method comprising contacting the surface with a composition of claim 20.

23. A surface cleaning composition comprising:

1,2-dimethylimidazole; and an alkylene glycol ether.

24. The surface cleaning composition of claim 23, wherein the alkylene glycol ether is selected from the group consisting of ethylene glycol monobutyl ether, diethylene glycol monobutyl ether, and mixtures thereof.

25. The surface cleaning composition of claim 23, further comprising limonene.

26. The method of removing a material according to claim 23, wherein the composition is substantially free of 1-methyl-2-pyrrolidone and of 1-ethyl-2-pyrrolidone.

27. A method for removing a residue comprising polyurethane from a surface of a mold or other part, the method comprising contacting the surface with a composition of claim 23.

* * * * *